United States Patent
Paczkowski et al.

(10) Patent No.: US 10,404,456 B2
(45) Date of Patent: Sep. 3, 2019

(54) NETWORK FUNCTION VIRTUALIZATION (NFV) HARDWARE TRUSTED HOSTED MANO

(71) Applicant: Sprint Communications Company L.P., Overland Park, KS (US)

(72) Inventors: Lyle Walter Paczkowski, Mission Hills, KS (US); Arun Rajagopal, Leawood, KS (US); Marouane Balmakhtar, Alexandria, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 215 days.

(21) Appl. No.: 15/394,507

(22) Filed: Dec. 29, 2016

(65) Prior Publication Data
US 2018/0191497 A1 Jul. 5, 2018

(51) Int. Cl.
H04L 29/06 (2006.01)
H04L 9/08 (2006.01)
H04L 9/32 (2006.01)
H04L 12/24 (2006.01)

(52) U.S. Cl.
CPC .......... *H04L 9/0861* (2013.01); *H04L 9/3236* (2013.01); *H04L 9/3263* (2013.01); *H04L 41/042* (2013.01); *H04L 63/0823* (2013.01)

(58) Field of Classification Search
CPC ... H04L 9/0861; H04L 9/3236; H04L 9/3263; H04L 41/042; H04L 63/0823
USPC ........................................................ 713/156
See application file for complete search history.

(56) References Cited

U.S. PATENT DOCUMENTS

| 8,971,538 | B1 | 3/2015 | Marr et al. |
| 9,386,001 | B1 | 7/2016 | Marquardt et al. |
| 2012/0266252 | A1* | 10/2012 | Spiers ................. H04L 63/0218 726/26 |

(Continued)

FOREIGN PATENT DOCUMENTS

| WO | 2015062627 | 5/2015 |
| WO | 2016081867 | 5/2016 |

(Continued)

OTHER PUBLICATIONS

Ben Pfaff; Extending Networking into the Virtualization Layer; Opnswitch.org; p. 1-6 (Year: 2009).*

(Continued)

*Primary Examiner* — Monjur Rahim

(57) ABSTRACT

A Network Function Virtualization (NFV) data communication system implements hardware trusted Management and Orchestration (MANO). A Hardware (HW) trust server issues a HW trust challenge to a MANO system. The MANO system hashes its physically-embedded hardware trust key to generate a HW trust result and transfers the HW trust result to the HW trust server. The HW trust server validates the hardware trust result and transfers a HW trust certificate to the MANO system. The MANO system transfers the HW trust certificate and NFV MANO data to an NFV Infrastructure (NFVI). The NFVI validates the HW trust certificate. The NFVI exchanges user data responsive to the NFV MANO data when the HW trust certificate is valid. The NFVI isolates the NFV MANO data when the HW trust certificate is not valid.

20 Claims, 7 Drawing Sheets

(56) References Cited

U.S. PATENT DOCUMENTS

| | | | |
|---|---|---|---|
| 2014/0229945 A1* | 8/2014 | Barkai | H04L 49/70 718/1 |
| 2015/0358161 A1* | 12/2015 | Kancharla | H04L 63/0485 713/164 |
| 2016/0182567 A1* | 6/2016 | Sood | H04L 63/20 726/1 |
| 2016/0219076 A1 | 7/2016 | Paczkowski et al. | |
| 2016/0226913 A1* | 8/2016 | Sood | H04L 63/20 |
| 2017/0177873 A1* | 6/2017 | Raghuram | G06F 21/53 |
| 2017/0364685 A1* | 12/2017 | Shah | G06F 21/53 |
| 2018/0004954 A1* | 1/2018 | Liguori | H04L 9/3263 |
| 2018/0114012 A1* | 4/2018 | Sood | G06F 21/53 |

FOREIGN PATENT DOCUMENTS

| | | |
|---|---|---|
| WO | 2016096005 | 6/2016 |
| WO | 2016182656 A1 | 11/2016 |

OTHER PUBLICATIONS

Dr. Jim Metzler; "The 2015 Guide to SDN and NFV;" 2015; pp. 1-90; Webtorials.
ETSI; "Network Functions Virtualisation (NFV); Management and Orchestration;" Group Specification; Dec. 2014 pp. 1-184; ETSI GS NFV-MAN 001 V1.1.1; ETSI; Sophia Antipolis Cedex, France.
ETSI; "Network Functions Virtualisation (NFV); Security Report; Security Management and Monitoring for NFV [Release 2];" Group Specification; Oct. 2016; pp. 1-53; Draft ETSI GS NFV-SEC 013 V0.0.5; ETSI; Sophia Antipolis Cedex, France.

* cited by examiner

NETWORK FUNCTION VIRTUALIZATION (NFV) HARDWARE TRUSTED HOSTED MANO

TECHNICAL BACKGROUND

Data communication systems exchange user data for user devices to provide various data communication services. The user devices may be phones, computers, media players, and the like. The data communication services might trust be media streaming, audio/video conferencing, data messaging, or internet access. Network Function Virtualization (NFV) computer systems are used to host data communication systems and deliver their data communication services.

NFV computer systems have Virtual Network Functions (VNFs) that perform data networking tasks. The NFV computer systems execute the VNFs under the control of a virtual software layer. The VNFs communicate with one another over the virtual layer. The VNFs also communicate with external systems over the virtual layer. To implement a data communication service, an NFV Management and Orchestration (MANO) system directs the virtual layer software to drive the execution of VNFs based on various descriptors for the data communication service.

In a Software Defined Network (SDN), the VNFs may be SDN applications, SDN controllers, and virtual SDN data machines. The executing VNFs drive the delivery of the data communication services. The MANO system may scale the data communication system by adding and removing VNFs. The MANO system may scale the VNFs by adding and removing their computer hardware resources and virtual layer components like virtual switching.

Hardware trust entails the software verification of the identity of the physical hardware that is executing the software and handling the user data. Some computer hardware has physically-embedded hardware trust keys. Hardware trust software drives circuitry to read and hash these physical keys to prove hardware identity. A hardware trust server that stores a copy of the hardware trust keys validates the hardware identities by performing the same hashes and comparing the hash results. Unfortunately, hardware trust is not effectively deployed in NFV infrastructures and MANO systems. In particular, NFV Infrastructures (NFVIs) do not have efficient and effective access to hardware trusted MANO systems that are hosted on different computer hardware.

Technical Overview

A Network Function Virtualization (NFV) data communication system implements hardware trusted Management and Orchestration (MANO). A Hardware (HW) trust server issues a HW trust challenge to a MANO system. The MANO system hashes its physically-embedded hardware trust key to generate a HW trust result and transfers the HW trust result to the HW trust server. The HW trust server validates the hardware trust result and transfers a HW trust certificate to the MANO system. The MANO system transfers the HW trust certificate and NFV MANO data to an NFV Infrastructure (NFVI). The NFVI validates the HW trust certificate. The NFVI exchanges user data responsive to the NFV MANO data when the HW trust certificate is valid. The NFVI isolates the NFV MANO data when the HW trust certificate is not valid.

DETAILED DESCRIPTION

FIGS. 1-4 illustrate Network Function Virtualization (NFV) data communication system 100 to implement hardware trusted Management and Orchestration (MANO). NFV data communication system 100 exchanges user data for user devices like computers, phones, or some other intelligent machines. The data exchange supports data services such as content streaming, media conferencing, machine communications, internet access, or some other computerized information service.

Figure 1:
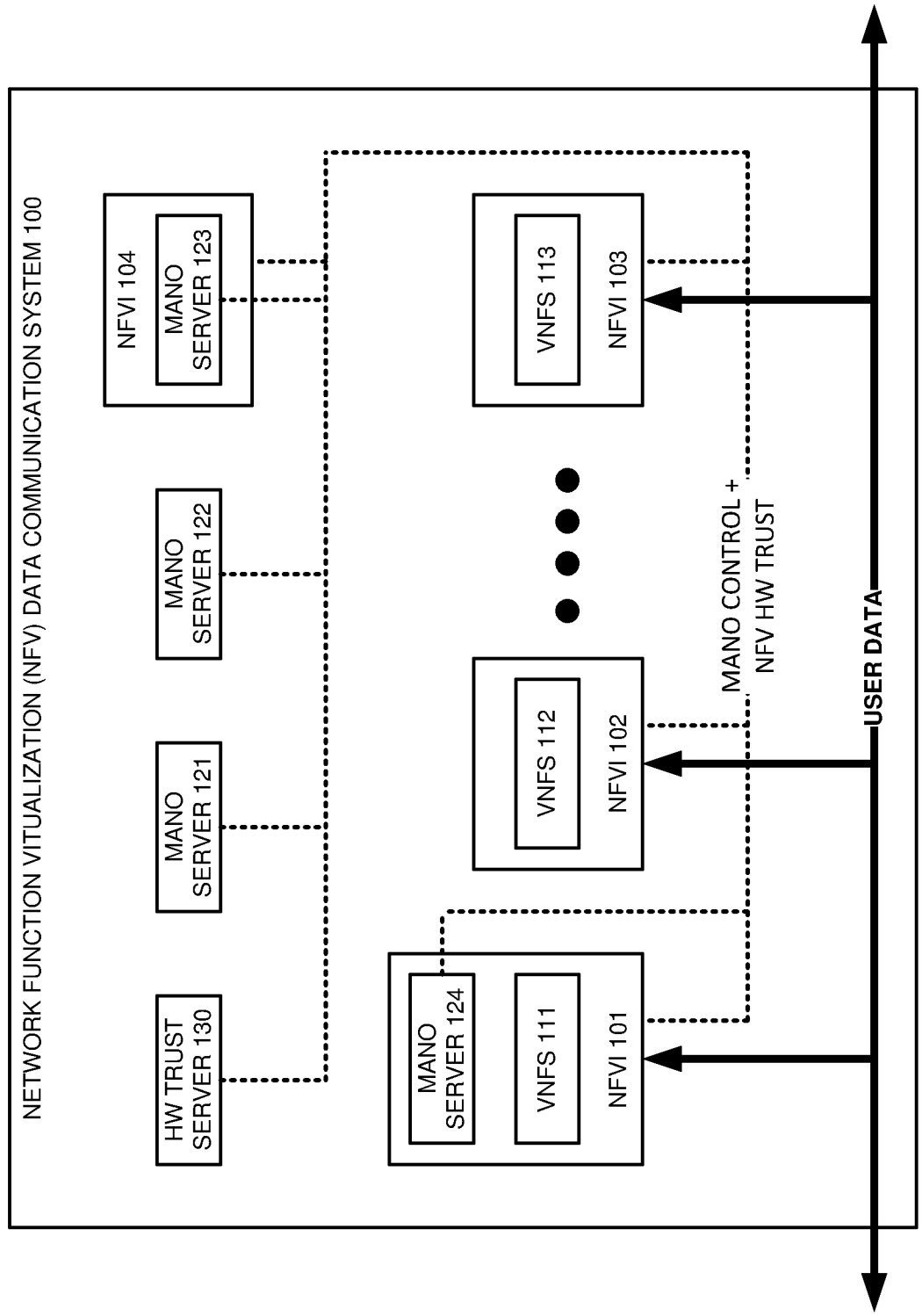
FIGS. 1-4 illustrate a Network Function Virtualization (NFV) data communication system to implement a hardware trusted Management and Orchestration (MANO) system.

NFV data communication system 100 is made of computer hardware like Central Processing Units (CPUs), Random Access Memory (RAM), persistent data storage, bus interfaces, and data transceivers. NFV data communication system 100 also has computer software like hypervisor, operating system, virtual machine, Virtual Network Function (VNF), Management and Orchestration (MANO), and hardware trust. Referring to FIG. 1, NFV data communication system 100 comprises NFV Infrastructures (NFVIs) 101-103, MANO servers 121-124, and Hardware (HW) trust server 130. The number of NFVIs is restricted for clarity.

NFVIs 101-103 execute VNFs 111-113 to exchange user data under VNF control. NFV data communication system 100 further includes MANO servers 121-124. MANO servers 121-124 exert management control over NFVIs 101-103 through the exchange of NFV MANO data. HW trust server 130 issues hardware trust challenges and verifies HW trust responses. HW trust server 130 distributes HW trust digital certificates to MANO servers 121-124 for validation by NFVIs 101-103 and/or VNFs 111-113. NFVIs 101-103 and MANO servers 121-124 each include a unique and secret physically-embedded hardware trust key. NFVIs 101-103 and MANO servers 121-124 read and process these physical hardware trust keys to perform hardware trust operations. HW trust server 130 stores a set of the hardware trust keys.

Figure 2:
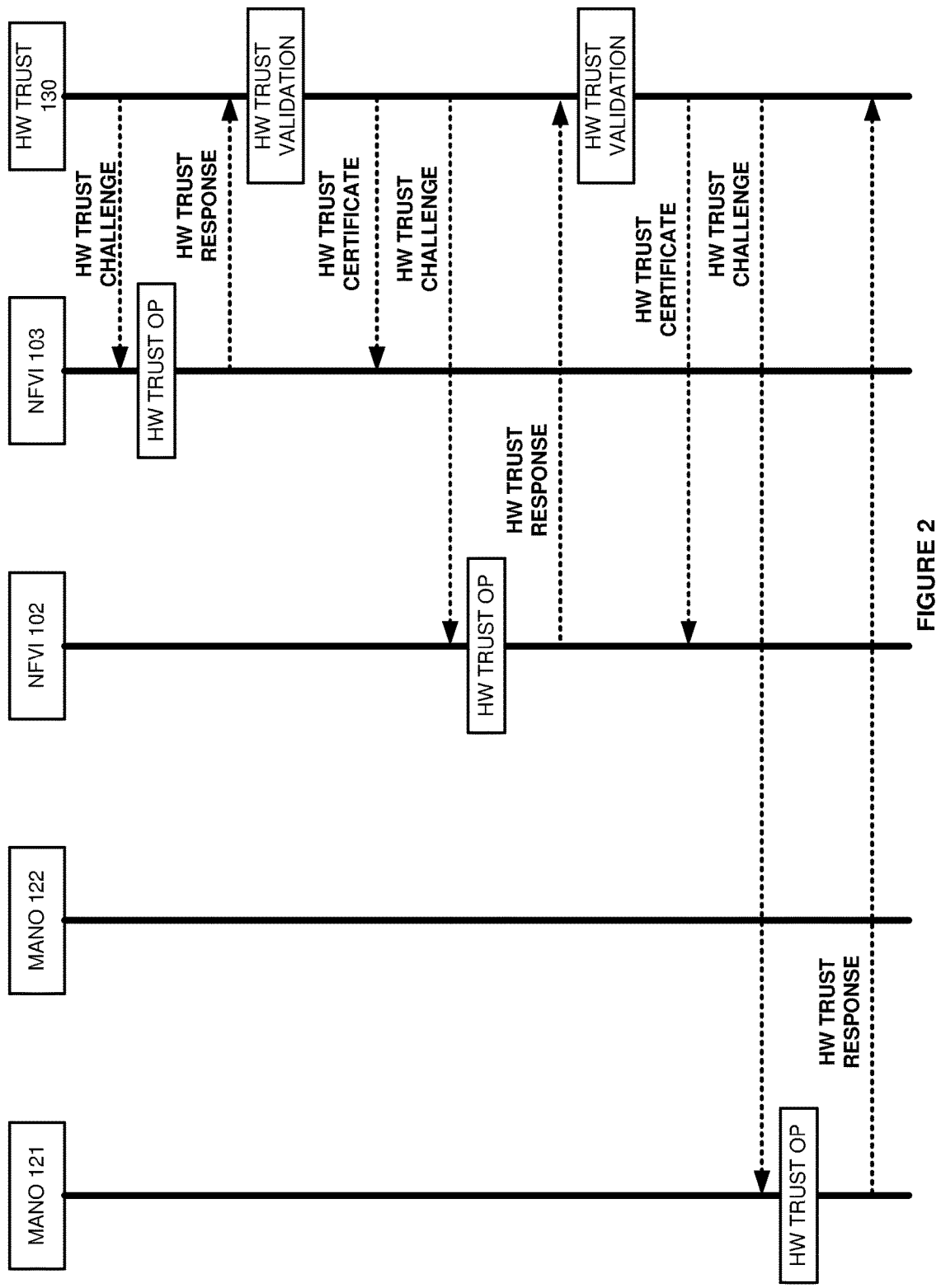
Figure 3:
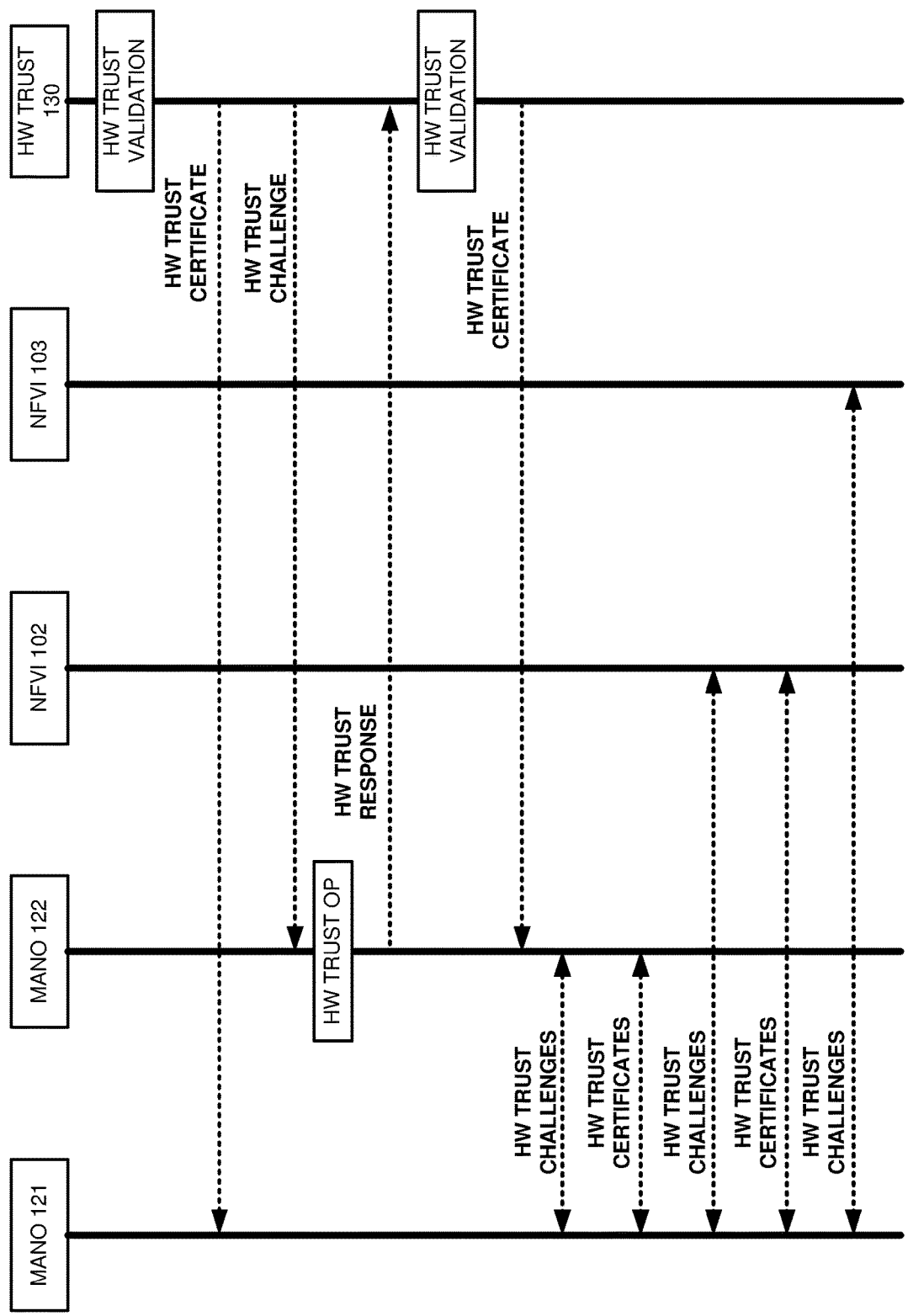
Figure 4:
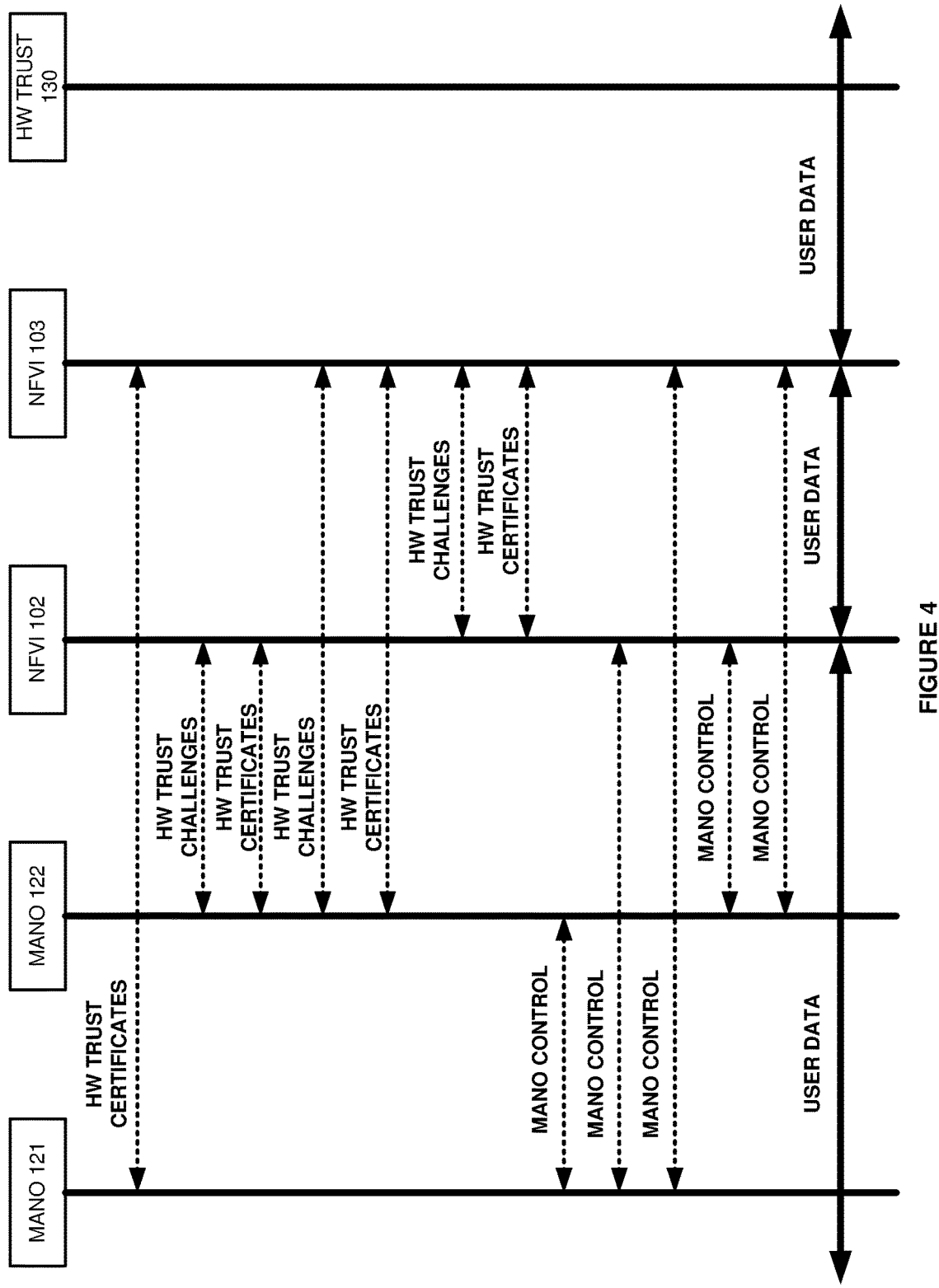

Referring to FIGS. 2-4, the operation of NFV data communication system 100 is described. On FIG. 2, HW trust server 130 issues a HW trust challenge to NFVI 103 indicating a random number. NFVI 103 performs a HW trust operation (OP) by hashing the random number with its physically-embedded hardware trust key to generate a HW trust result. NFVI 103 transfers the HW trust result to HW trust server 130. HW trust server 130 validates the hardware trust result by performing the same hash on the same random number and HW trust key to generate the same HW trust result. If the HW trust validation is positive, then HW trust server 130 transfers a HW trust certificate to NFVI 103. HW trust server 130 transfers a HW trust certificate to NFVI 103 in this example.

In a like manner, HW trust server 130 issues a HW trust challenge to NFVI 102 indicating a random number. NFVI 102 performs a HW trust operation by hashing the random number with its physically-embedded hardware trust key to generate a HW trust result. NFVI 102 transfers its HW trust result to HW trust server 130. HW trust server 130 validates the hardware trust result, and since the HW trust validation is positive, HW trust server 130 transfers a HW trust certificate to NFVI 102.

HW trust server 130 also issues a HW trust challenge to MANO server 121 indicating a random number. MANO server 121 performs the HW trust operation by hashing its random number and physically-embedded hardware trust key to generate the HW trust result. MANO server 121 transfers its HW trust result to HW trust server 130. Referring to FIG. 3, HW trust server 130 validates the hardware trust result, and since the HW trust validation is positive, HW trust server 130 transfers a HW trust certificate to MANO server 121.

Likewise, HW trust server 130 issues a HW trust challenge to MANO server 122 indicating a random number. MANO server 122 performs the HW trust operation by hashing its random number and physically-embedded hardware trust key to generate the HW trust result. MANO server 122 transfers its HW trust result to HW trust server 130. HW trust server 130 validates the hardware trust result, and since the HW trust validation is positive, HW trust server 130 transfers a HW trust certificate to MANO server 122.

MANO servers 121-122 exchange HW trust challenge data with one another and responsively exchange their HW trust certificates. NFVI 102 and MANO system 121 exchange HW trust challenge data with one another and responsively exchange their HW trust certificates. NFVI 103 and MANO system 121 exchange HW trust challenge data with one another, and referring to FIG. 4, NFVI 103 and MANO system 121 responsively exchange their HW trust certificates. NFVI 102 and MANO system 122 exchange HW trust challenge data with one another, and NFVI 103 and MANO system 121 responsively exchange their HW trust certificates. NFVI 103 and MANO system 122 exchange HW trust challenge data with one another, and NFVI 103 and MANO system 122 responsively exchange their HW trust certificates. NFVIs 102-103 exchange HW trust challenge data with one another and responsively exchange their HW trust certificates.

The above HW trust data transfers may occur over MANO interfaces like VNF-VNFM, VIM-hypervisor, and orchestration-orchestration. After the above HW trust data transfers, the HW trust certificates are verified by the receiving entity by using a key from HW trust server 130. Any hardware trust failures are reported to HW trust server 130 and operations are performed to isolate the untrusted system.

Once HW trust is established, MANO servers 121-122 exchange NFV MANO data with one another and with NFVIs 102-103. NFVIs 102-103 will isolate (and not implement) the NFV MANO data from a MANO server that does not have current HW trust. NFVIs 102-103 do not exchange user data with NFVIs that do not have current HW trust. MANO servers 121-122 do not provide NFV MANO data to NFVIs or other MANO servers that do not have current HW trust. Since HW trust is established in this example, the NFVIs exchange user data responsive to the MANO control.

Advantageously, MANO servers may be hosted separately from NFVIs but remain hardware trusted. NFV MANO server 123 is hosted by NFVI 104, and NFVI 104 is physically discrete from NFVI 102. NFVI 102 can refuse NFV MANO control from hosted MANO server 123 until MANO server 123 provides a valid hardware trust certificate. Thus, NFVIs can use various MANO servers in an on-demand fashion with the security of hardware trust. NFVIs can use the same technique to accept user data from only hardware trusted NFVIs. In a like manner, MANO servers can also be configured to only interact with hardware trusted MANO servers and NFVIs.

Figure 5:
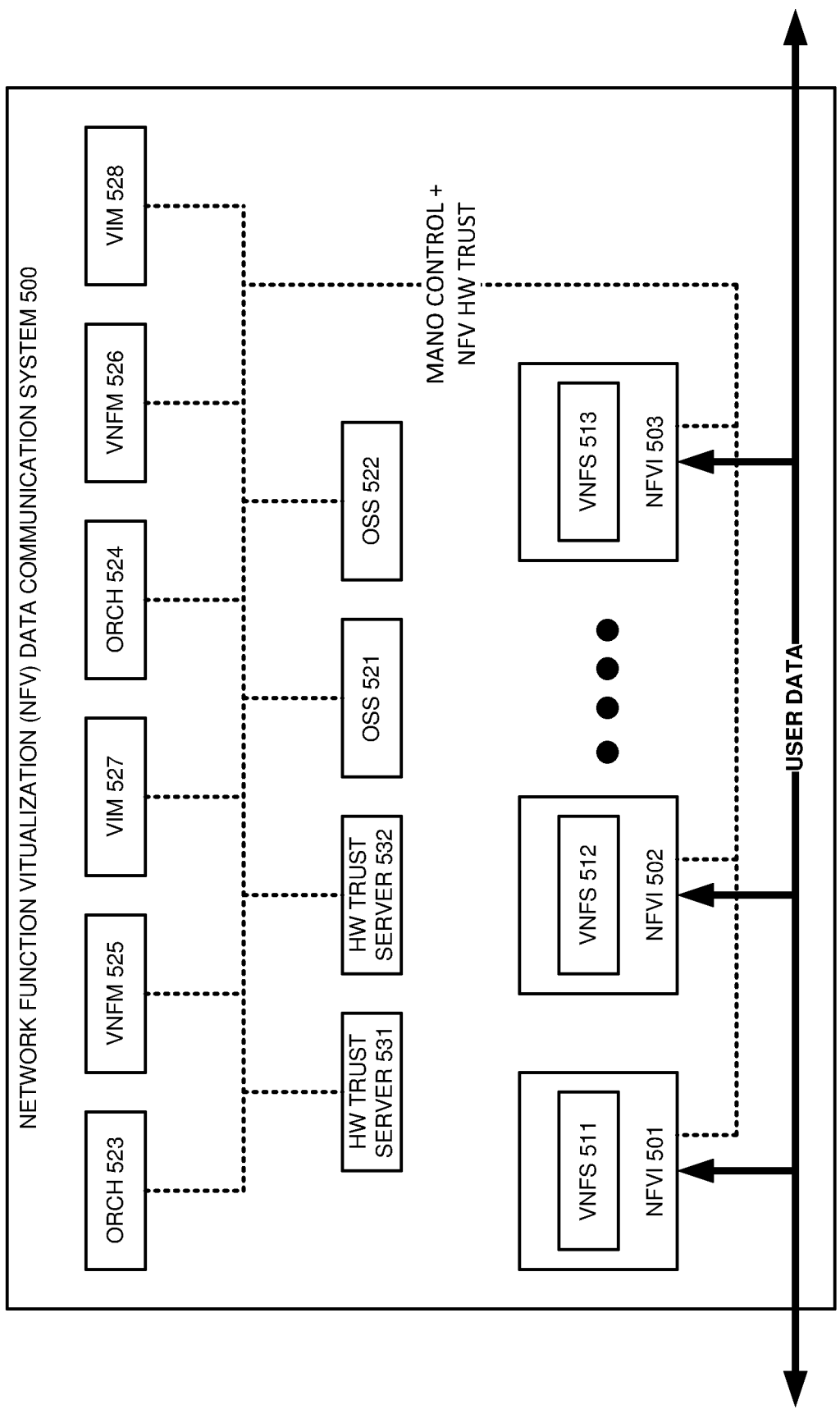
FIG. 5 illustrates an NFV data communication system to implement a hardware trusted and distributed MANO system.

FIG. 5 illustrates Network Function Virtualization (NFV) data communication system 500 to implement a hardware trusted and distributed Management and Orchestration (MANO). NFV system 500 is an example of NFV data communication system 100, although NFV system 100 may vary from this example. NFV data communication system 500 comprises NFV Infrastructures (NFVIs) 501-503 that execute Virtual Network Functions (VNFs) 511-513. VNFs 511-513 drive NFVIs 501-503 to exchange user data to support various user data services. The number of NFVIs is restricted for clarity.

NFV data communication system 500 also features a distributed MANO system that comprises: Operations Support Systems (OSS) 521-522, MANO orchestrators (ORCH) 523-524, VNF Managers (VNFMs) 525-526, Virtual Infrastructure Managers (VIMs) 527-528, and Hardware (HW) trust servers 531-532. Read-only HW trust keys are physically embedded into the Central Processing Unit (CPU) hardware for each of: OSS 521-522, MANO orchestrators 523-524, VNFMs 525-526, and VIMs 527-528. Thus, NFV data communication system 500 offers a physically-distributed MANO system that is available to multiple NFVIs on a hardware trusted basis.

HW trust servers 531-532 issue HW trust challenges to OSS 521-522, MANO orchestrators 523-524, VNFMs 525-526, and VIMs 527-528. OSS 521-522, MANO orchestrators 523-524, VNFMs 525-526, and VIMs 527-528 each hash their HW trust challenges with their hardware trust keys to generate and transfer their HW trust results. HW trust servers 531-532 validate the hardware trust results by generating the same HW trust results. If the HW trust validation is positive, then HW trust servers 531-532 transfer a HW trust certificate to the HW trusted MANO subsystem.

NFVIs 501-503 request HW trust certificates from VNFMs 525-526 and VIMs 527-528. In response, VNFMs 525-526 and VIMs 527-528 request HW trust certificates from orchestrators 523-524. In response, orchestrators request HW trust certificates from OSS 521-522. OSS 521-522 returns HW trust certificates to orchestrators 523-524. Orchestrators 523-524 validate and return the valid HW trust certificates to VNFMs 525-526 and VIMs 527-528. VNFMs 525-526 and VIMs 527-528 validate and return the HW trust certificates to NFVIs 501-503.

In NFVIs 501-503, hypervisors or operating systems validate the HW trust certificates from VIMs 525-526 using public keys for certificate authorities in hardware trust servers 531-532. In NFVIs 501-503, VNFs 511-513 also validate the HW trust certificates from VNFMs 525-526 using public keys for the certificate authorities in hardware trust servers 531-532. Once HW trust is established across the distributed MANO system, NFVIs 501-503 may implement NFV MANO control data to drive the delivery of data communications services from trusted hardware. An individual NFVI will not implement NFV MANO control from a MANO system unless all MANO control components (VNFM, VIM, orchestrator, and OSS) are hardware trusted.

Advantageously, the MANO system is both redundant and distributed. The redundancy provides robustness to the MANO system and has been simplified for clarity. The distribution provides efficient MANO access to NFVIs since proximate MANO interfaces could be used when available. The hardware trust allows NFVIs to access robust NFV MANO systems in an efficient and secure manner.

Figure 6:
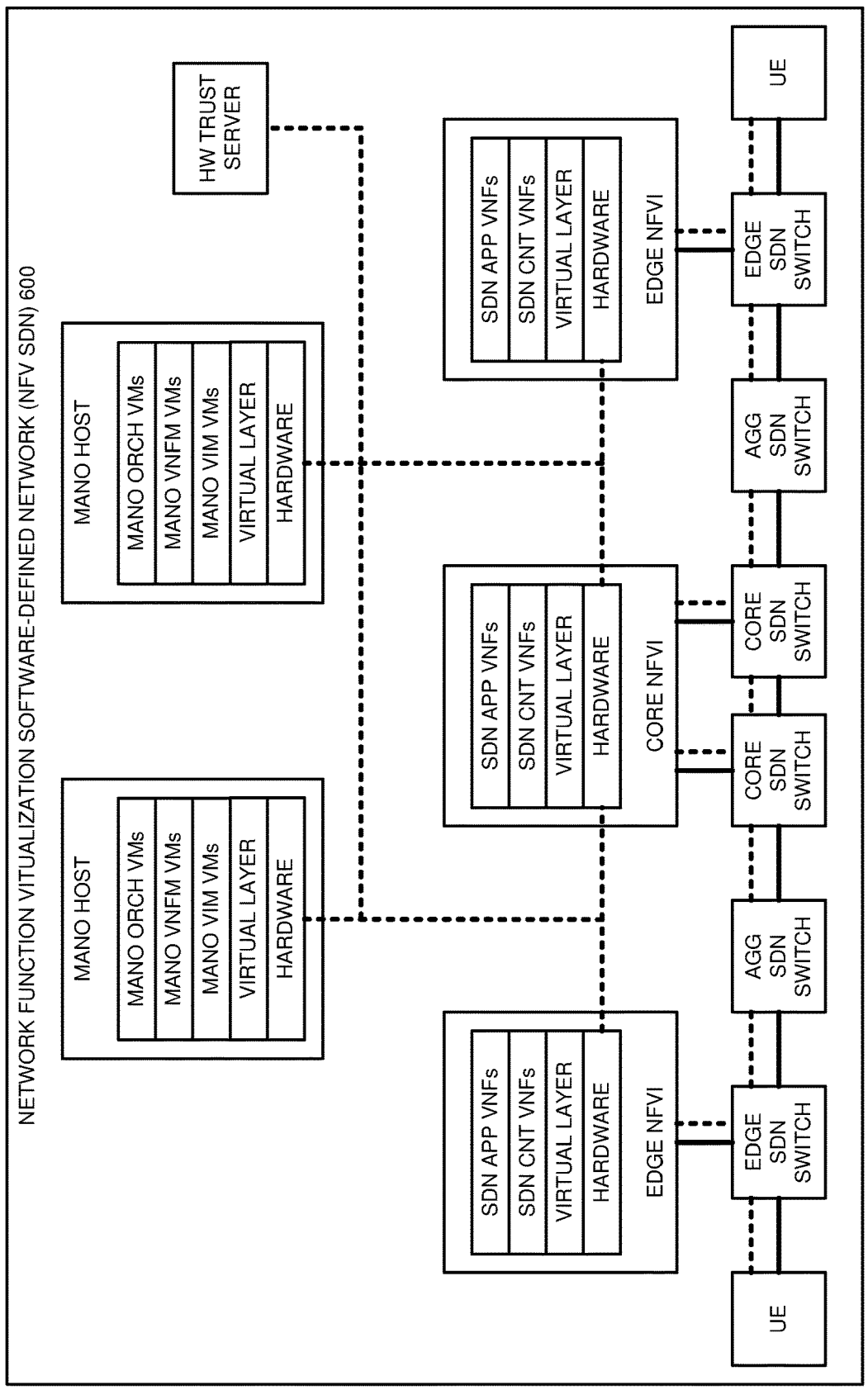
FIG. 6 illustrates an NFV Software Defined Network (SDN) to implement a hardware trusted MANO system.

FIG. 6 illustrates Network Function Virtualization (NFV) Software Defined Network (SDN) 600 to implement a hardware trusted Management and Orchestration (MANO). NFV SDN 600 is an example of NFV data communication system 100, although system 100 may use alternative configurations and operations. NFV SDN 600 comprises: User Equipment (UE), edge SDN switches, aggregation (AGG) SDN switches, core SDN switches, edge NFVIs, a core NFVI, and a MANO NFVI. The NFVIs comprise hardware such as server blades with CPU cores, data memories, I/O transceivers, and the like. The edge SDN switches may include wireless base station VNFs that drive nearby wireless transceivers to exchange wireless data with the UEs.

The NFVIs execute virtual layer software to provide a virtualized processing environment to VNFs and virtual machines. The virtual layer comprises virtual hardware interfaces, hypervisors, operating systems, and NFVI controllers. Under the control of the MANO system, the virtual layers support various SDN VNFs. In the edge and core NFVIs, the virtual layers support SDN controller (CNT) VNFs and SDN application (APP) VNFs. In the MANO hosts, the virtual layer supports Virtual Machines (VMs) for MANO Virtual Infrastructure Managers (VIMs), VNF Managers (VNFMs), and Orchestrators (ORCHs).

Under the direction of the MANO ORCHs, the VIMs and VNFMs transfer networking data to the edge and core virtual layers to drive the execution of the SDN APP and CNT VNFs. To set-up a data session between the UEs, one of the UEs transfers a session request to an SDN application VNF. The SDN application VNF informs other SDN application VNFs to extend the session. The SDN VNFs transfer SDN controller API calls for the UE session to their associated SDN controller VNFs. The SDN controller VNFs transfer SDN data machine API calls to the SDN switches.

API responses flow back from the SDN switches to the SDN controller VNFs and to the SDN application VNFs. If needed, an SDN application VNF may direct an SDN controller VNF to drive an SDN data machine to deliver user data to an NFVI for heavier processing by NFV data-processing VNFs. For example, a given flow may be directed to a VNF to perform packet inspection, encryption, or the like.

Before and during the delivery of these services, the HW trust server issues HW trust challenges to the MANO hosts. The MANO hosts each hash their HW trust challenges with their HW trust keys to generate and transfer HW trust results. The HW trust server validates the HW trust results. If the HW trust validation is positive, then the HW trust server transfers a HW trust certificate to the HW trusted MANO host.

The NFVIs request HW trust certificates from the MANO hosts, and the MANO hosts transfer their HW trust certificates to the requesting NFVIs. In NFVIs 501-503, the virtual layers and VNFs validate the HW trust certificates using keys from a certificate authority in the hardware trust server. If HW trust is established for a MANO host, then an NFVI will implement NFV MANO control data from that MANO host. An NFVI will not implement NFV MANO control data from a hardware-untrusted MANO host.

Figure 7:
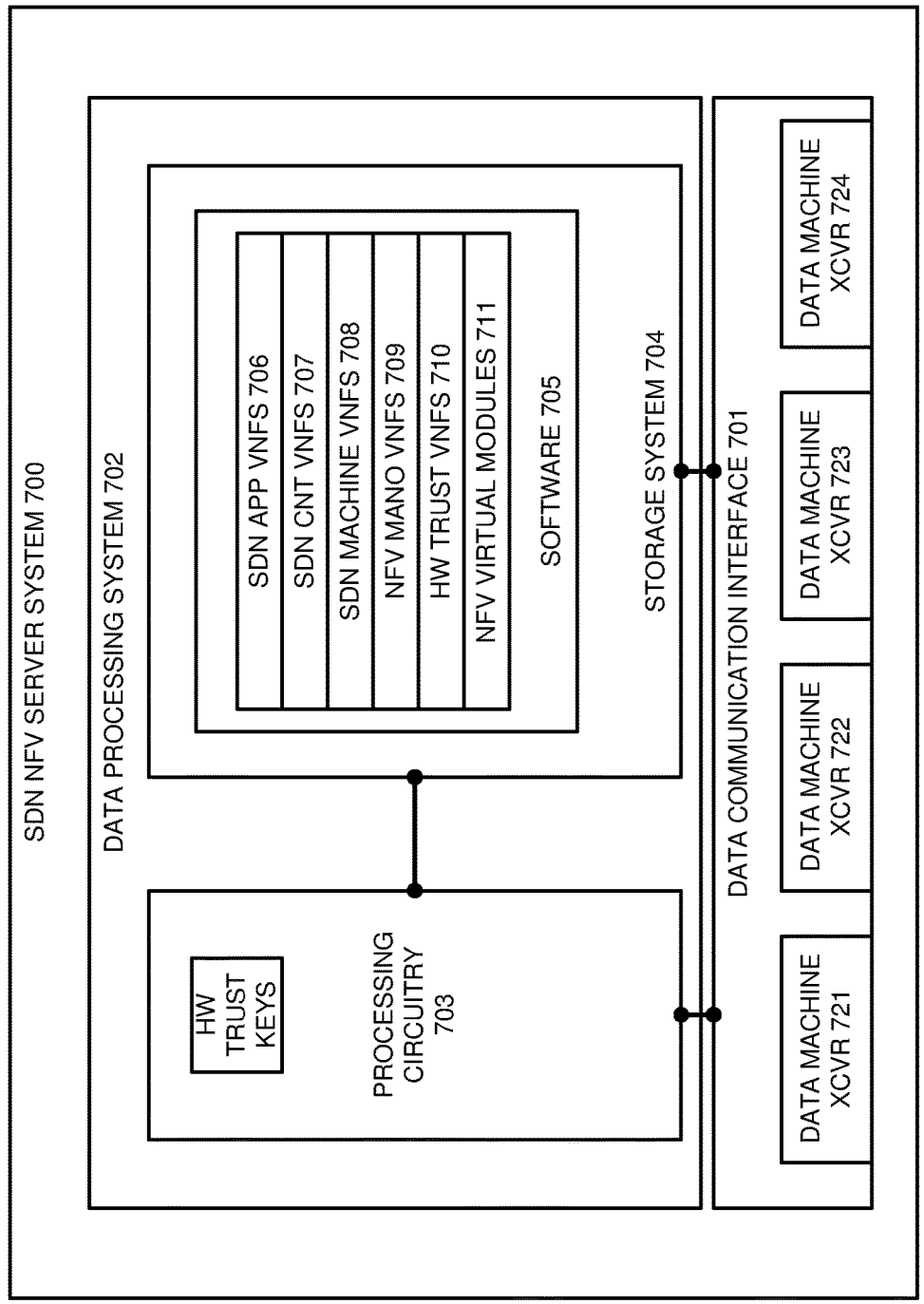
FIG. 7 illustrates an SDN NFV server system to implement hardware trusted MANO system.

FIG. 7 illustrates Software Defined Network (SDN) Network Function Virtualization (NFV) server system 700 to implement hardware trusted Management and Orchestration (MANO). SDN NFV server system 700 is an example of NFV SDN 100, although network 100 may use alternative configurations and operations. SDN NFV server system 700 comprises data communication interface 701 and data processing system 702. Data communication interface 701 comprises data machine transceivers 721-724. Data processing system 702 comprises processing circuitry 703 and storage system 704. Processing circuitry 703 has a physically embedded trust key in each CPU. Storage system 704 stores software 705. Software 705 includes respective software modules 706-711.

Data machine transceivers 721-724 comprise communication components, such as ports, bus interfaces, signal processors, memory, software, and the like. Processing circuitry 703 comprises server blades, circuit boards, bus interfaces, integrated circuitry, and associated electronics. Processing circuitry 703 features CPUs with hardware trust keys that are physically-embedded in internal read-only circuitry. Storage system 704 comprises non-transitory, machine-readable, data storage media, such as flash drives, disc drives, memory circuitry, servers, and the like. Software 705 comprises machine-readable instructions that control the operation of processing circuitry 703 when executed.

SDN NFV server system 700 may be centralized or distributed. All or portions of software 706-711 may be externally stored on one or more storage media, such as circuitry, discs, and the like. Some conventional aspects of SDN NFV server system 700 are omitted for clarity, such as power supplies, enclosures, and the like. When executed by processing circuitry 703, software modules 706-711 direct circuitry 703 to perform the following operations.

SDN application VNFs 706 process user and network data to drive SDN controller VNFs 707 to deliver data communication services to users. SDN controller VNFs 707 process the SDN application API calls to generate SDN data machine API calls that drive external SDN data machines to deliver data communication services to users. SDN machine VNFs 708 comprise virtual SDN data machines that process user traffic for tasks like encryption, transcoding, and the like. NFV MANO VNFs 709 orchestrate and manage SDN VNFs 706-708. HW trust VNFs 710 issue hardware trust challenges, perform hardware trust validations, and issue hardware trust certificates. NFV virtual modules 711 include hypervisors, virtual containers, and NFV control software.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Network Function Virtualization (NFV) data communication system to implement hardware trusted Management and Orchestration (MANO) computer system, the method comprising:
 a Hardware (HW) trust server issuing a HW trust challenge to a MANO computer system;
 the MANO computer system hashing its physically-embedded, read-only hardware trust key to generate a HW trust result and transferring the HW trust result to the HW trust server;
 the HW trust server validating the hardware trust result and transferring a HW trust certificate to the MANO computer system;
 the MANO computer system transferring the HW trust certificate and NFV MANO data to NFV Infrastructure (NFVI) circuitry; and
 the NFVI circuitry validating the HW trust certificate, exchanging user data responsive to the NFV MANO data when the HW trust certificate is valid, and isolating the NFV MANO data when the HW trust certificate is not valid.

2. The method of claim 1 wherein the NFVI circuitry comprises a first NFVI circuitry and further comprising:
the MANO computer system transferring the HW trust certificate and second NFV MANO data to a second NFVI circuitry; and
the second NFVI circuitry validating the HW trust certificate, exchanging second user data responsive to the second NFV MANO data when the HW trust certificate is valid, and isolating the second NFV MANO data when the HW trust certificate is not valid.

3. The method of claim 1 wherein the MANO computer system comprises a first MANO computer system and further comprising:
the HW trust server issuing a HW trust challenge to a second MANO computer system;
the second MANO computer system hashing its physically-embedded, read-only hardware trust key to generate a second HW trust result and transferring the second HW trust result to the HW trust server;
the HW trust server validating the second hardware trust result and transferring a second HW trust certificate to the second MANO computer system;
the second MANO computer system transferring the second HW trust certificate and second NFV MANO data to the NFVI circuitry; and
the NFVI circuitry validating the second HW trust certificate, exchanging second user data responsive to the second NFV MANO data when the second HW trust certificate is valid, and isolating the second NFV MANO data when the second HW trust certificate is not valid.

4. The method of claim 1 wherein the NFVI circuitry comprises a first NFVI circuitry and further comprising:
the HW trust server issuing a HW trust challenge to a second NFVI circuitry;
the second NFVI circuitry hashing its physically-embedded, read-only hardware trust key to generate a second HW trust result and transferring the second HW trust result to the HW trust server;
the HW trust server validating the second hardware trust result and transferring a second HW trust certificate to the second NFVI circuitry;
the second NFVI circuitry transferring the second HW trust certificate to the first NFVI circuitry; and
the first NFVI circuitry validating the second HW trust certificate, transferring second user data from the second NFVI circuitry when the second HW trust certificate is valid, and isolating the second user data when the second HW trust certificate is not valid.

5. The method of claim 1 wherein the MANO computer system comprises a first MANO computer system and further comprising:
the HW trust server issuing a HW trust challenge to a second MANO computer system;
the second MANO computer system hashing its physically-embedded, read-only hardware trust key to generate a second HW trust result and transferring the second HW trust result to the HW trust server;
the HW trust server validating the second hardware trust result and transferring a second HW trust certificate to the second MANO computer system;
the second MANO computer system transferring the second HW trust certificate to the first MANO computer system; and
the first MANO computer system validating the second HW trust certificate, implementing second NFV MANO data from the second MANO computer system when the second HW trust certificate is valid, and isolating the second NFV MANO data when the second HW trust certificate is not valid.

6. The method of claim 1 wherein the MANO computer system comprises a first MANO computer system having a MANO orchestrator and a second MANO computer system having an Operations Support System (OSS) and further comprising:
the HW trust server issuing a HW trust challenge to the second MANO computer system;
the second MANO computer system hashing its physically-embedded, read-only hardware trust key to generate a second HW trust result and transferring the second HW trust result to the HW trust server;
the HW trust server validating the second hardware trust result and transferring a second HW trust certificate to the second MANO computer system;
the OSS in the second MANO computer system transferring the second HW trust certificate to the MANO orchestrator in the first MANO computer system; and
the MANO orchestrator validating the second HW trust certificate, implementing second NFV MANO data from the OSS when the second HW trust certificate is valid, and isolating the second NFV MANO data when the second HW trust certificate is not valid.

7. The method of claim 1 wherein the MANO computer system comprises a first MANO computer system having a Virtual Infrastructure Manager (VIM) and second MANO computer system having a MANO orchestrator and further comprising:
the HW trust server issuing a HW trust challenge to the second MANO computer system;
the second MANO computer system hashing its physically-embedded, read-only hardware trust key to generate a second HW trust result and transferring the second HW trust result to the HW trust server;
the HW trust server validating the second hardware trust result and transferring a second HW trust certificate to the second MANO computer system;
the MANO orchestrator in the second MANO computer system transferring the second HW trust certificate to the VIM in the first MANO computer system; and
the VIM validating the second HW trust certificate, implementing second NFV MANO data from the MANO orchestrator when the second HW trust certificate is valid, and isolating the second NFV MANO data when the second HW trust certificate is not valid.

8. The method of claim 1 wherein the MANO computer system comprises a first MANO computer system having a Virtual Network Function Manager (VNFM) and second MANO computer system having a MANO orchestrator and further comprising:
the HW trust server issuing a HW trust challenge to the second MANO computer system;
the second MANO computer system hashing its physically-embedded, read-only hardware trust key to generate a second HW trust result and transferring the second HW trust result to the HW trust server;
the HW trust server validating the second hardware trust result and transferring a second HW trust certificate to the second MANO computer system;
the MANO orchestrator in the second MANO computer system transferring the second HW trust certificate to the VNFM in the first MANO computer system; and the VNFM validating the second HW trust certificate, implementing second NFV MANO data from the MANO orchestrator when the second HW trust certificate is valid, and isolating the second NFV MANO data when the second HW trust certificate is not valid.

9. The method of claim 1 wherein the MANO computer system comprises a Virtual Network Function Manager VNFM and the NFVI circuitry comprises a Virtual Network Function (VNF); and wherein the MANO computer system transferring the HW trust certificate and NFV management data to the NFVI circuitry comprises the VNFM transferring the HW trust certificate and the NFV management data to the VNF; and the NFVI circuitry validating the HW trust certificate and exchanging the user data responsive to the NFV management data when the HW trust certificate is valid comprises the VNF validating the HW trust certificate and exchanging the user data responsive to the NFV MANO data when the HW trust certificate is valid.

10. The method of claim 1 wherein the MANO computer system comprises a Virtual Infrastructure Manager (VIM) and the NFVI circuitry comprises a virtual layer; and wherein the MANO computer system transferring the HW trust certificate and the NFV MANO data to an NFV Infrastructure (NFVI) circuitry comprises the VIM transferring the HW trust certificate and the NFV MANO data to the virtual layer; and the NFVI circuitry validating the HW trust certificate and exchanging the user data responsive to the NFV MANO data when the HW trust certificate is valid comprises the virtual layer validating the HW trust certificate and exchanging the user data responsive to the NFV MANO data when the HW trust certificate is valid.

11. A Network Function Virtualization (NFV) data communication system to implement hardware trusted Management and Orchestration (MANO), the NFV data communication system comprising:

a Hardware (HW) trust server configured to issue a HW trust challenge to a MANO computer system;

the MANO computer system configured to hash its physically-embedded, read-only hardware trust key to generate a HW trust result and transferring the HW trust result to the HW trust server;

the HW trust server configured to validate the hardware trust result and transfer a HW trust certificate to the MANO computer system;

the MANO computer system configured to transfer the HW trust certificate and NFV MANO data to NFV Infrastructure (NFVI) circuitry; and the NFVI circuitry configured to validate the HW trust certificate, exchange user data responsive to the NFV MANO data when the HW trust certificate is valid, and isolate the NFV MANO data when the HW trust certificate is not valid.

12. The NFV data communication system of claim 11 wherein the NFVI circuitry comprises a first NFVI circuitry and further comprising:

the MANO computer system configured to transfer the HW trust certificate and second NFV MANO data to a second NFVI circuitry; and the second NFVI circuitry configured to validate the HW trust certificate, exchange second user data responsive to the second NFV MANO data when the HW trust certificate is valid, and isolate the second NFV MANO data when the HW trust certificate is not valid.

13. The NFV data communication system of claim 11 wherein the MANO computer system comprises a first MANO computer system and further comprising:

the HW trust server configured to issue a HW trust challenge to a second MANO computer system;

the second MANO computer system configured to hash its physically-embedded read-only hardware trust key to generate a second HW trust result and transfer the second HW trust result to the HW trust server;

the HW trust server configured to validate the second hardware trust result and transfer a second HW trust certificate to the second MANO computer system;

the second MANO computer system configured to transfer the second HW trust certificate and second NFV MANO data to the NFVI circuitry; and the NFVI circuitry configured to validate the second HW trust certificate, exchange second user data responsive to the second NFV MANO data when the second HW trust certificate is valid, and isolate the second NFV MANO data when the second HW trust certificate is not valid.

14. The NFV data communication system of claim 11 wherein the NFVI circuitry comprises a first NFVI a circuitry nd further comprising:

the HW trust server configured to issue a HW trust challenge to a second NFVI circuitry;

the second NFVI circuitry configured to hash its physically-embedded, read-only hardware trust key to generate a second HW trust result and transfer the second HW trust result to the HW trust server;

the HW trust server configured to validate the second hardware trust result and transfer a second HW trust certificate to the second NFVI circuitry;

the second NFVI circuitry configured to transfer the second HW trust certificate to the first NFVI circuitry; and the first NFVI circuitry configured to validate the second HW trust certificate, transfer second user data from the second NFVI circuitry when the second HW trust certificate is valid, and isolate the second user data when the second HW trust certificate is not valid.

15. The NFV data communication system of claim 11 wherein the MANO computer system comprises a first MANO computer system and further comprising:

the HW trust server configured to issue a HW trust challenge to a second MANO computer system;

the second MANO computer system configured to hash its physically-embedded read-only hardware trust key to generate a second HW trust result and transfer the second HW trust result to the HW trust server;

the HW trust server configured to validate the second hardware trust result and transfer a second HW trust certificate to the second MANO computer system;

the second MANO computer system configured to transfer the second HW trust certificate to the first MANO computer system; and the first MANO computer system configured to validate the second HW trust certificate, implement second NFV MANO data from the second MANO computer system when the second HW trust certificate is valid, and isolate the second NFV MANO data when the second HW trust certificate is not valid.

16. The NFV data communication system of claim 11 wherein the MANO computer system comprises a first MANO computer system having a MANO orchestrator and a second MANO computer system having an Operations Support System (OSS) and further comprising:

the HW trust server configured to issue a HW trust challenge to the second MANO computer system;

the second MANO computer system configured to hash its physically-embedded read-only hardware trust key to generate a second HW trust result and transfer the second HW trust result to the HW trust server;

the HW trust server configured to validate the second hardware trust result and transfer a second HW trust certificate to the second MANO computer system;

the OSS in the second MANO computer system configured to transfer the second HW trust certificate to the MANO orchestrator in the first MANO computer system; and the MANO orchestrator configured to validate the second HW trust certificate, implement second NFV MANO data from the OSS when the second HW trust certificate is valid, and isolate the second NFV MANO data when the second HW trust certificate is not valid.

17. The NFV data communication system of claim 11 wherein the MANO computer system comprises a first MANO computer system having a Virtual Infrastructure Manager (VIM) and second MANO computer system having a MANO orchestrator and further comprising:

the HW trust server configured to issue a HW trust challenge to the second MANO computer system;

the second MANO computer system configured to hash its physically-embedded read-only hardware trust key to generate a second HW trust result and transfer the second HW trust result to the HW trust server;

the HW trust server configured to validate the second hardware trust result and transfer a second HW trust certificate to the second MANO computer system;

the MANO orchestrator in the second MANO computer system configured to transfer the second HW trust certificate to the VIM in the first MANO computer system; and the VIM configured to validate the second HW trust certificate, implement second NFV MANO data from the MANO orchestrator when the second HW trust certificate is valid, and isolate the second NFV MANO data when the second HW trust certificate is not valid.

18. The NFV data communication system of claim 11 wherein the MANO computer system comprises a first MANO computer system having a Virtual Network Function Manager (VNFM) and second MANO computer system having a MANO orchestrator and further comprising:

the HW trust server configured to issue a HW trust challenge to the second MANO computer system;

the second MANO computer system configured to hash its physically-embedded read-only hardware trust key to generate a second HW trust result and transfer the second HW trust result to the HW trust server;

the HW trust server configured to validate the second hardware trust result and transfer a second HW trust certificate to the second MANO computer system;

the MANO orchestrator in the second MANO computer system configured to transfer the second HW trust certificate to the VNFM in the first MANO computer system; and the VNFM configured to validate the second HW trust certificate, implement second NFV MANO data from the MANO orchestrator when the second HW trust certificate is valid, and isolate the second NFV MANO data when the second HW trust certificate is not valid.

19. The NFV data communication system of claim 11 wherein the MANO computer system comprises a Virtual Network Function Manager VNFM and the NFVI circuitry comprises a Virtual Network Function (VNF); and wherein the VNFM configured to transfer the HW trust certificate and the NFV management data to the VNF; and the VNF configured to validate the HW trust certificate and exchange the user data responsive to the NFV MANO data when the HW trust certificate is valid.

20. The NFV data communication system of claim 11 wherein the MANO computer system comprises a Virtual Infrastructure Manager (VIM) and the NFVI circuitry comprises a virtual layer; and wherein the VIM configured to transfer the HW trust certificate and the NFV MANO data to the virtual layer; and the virtual layer configured to validate the HW trust certificate and exchange the user data responsive to the NFV MANO data when the HW trust certificate is valid.

* * * * *